United States Patent
Snyder

(10) Patent No.: US 10,596,907 B2
(45) Date of Patent: Mar. 24, 2020

(54) DYNAMIC APPLICATION EXECUTION FOR AUTOMOBILE AND CLOUD HYBRID ENVIRONMENTS

(71) Applicant: Xevo Inc., Bellevue, WA (US)

(72) Inventor: Ira Snyder, Bellevue, WA (US)

(73) Assignee: Xevo Inc., Bellevue, WA (US)

( * ) Notice: Subject to any disclaimer, the term of this patent is extended or adjusted under 35 U.S.C. 154(b) by 0 days.

(21) Appl. No.: 16/357,324

(22) Filed: Mar. 19, 2019

(65) Prior Publication Data

US 2019/0210463 A1 Jul. 11, 2019

Related U.S. Application Data

(63) Continuation of application No. 15/048,385, filed on Feb. 19, 2016, now Pat. No. 10,232,709.

(51) Int. Cl.
*B60K 35/00* (2006.01)

(52) U.S. Cl.
CPC .......... *B60K 35/00* (2013.01); *B60K 2370/52* (2019.05); *B60K 2370/569* (2019.05); *B60K 2370/573* (2019.05); *B60K 2370/58* (2019.05); *B60K 2370/589* (2019.05); *B60K 2370/5899* (2019.05); *B60K 2370/592* (2019.05); *B60K 2370/595* (2019.05); *B60K 2370/5911* (2019.05)

(58) Field of Classification Search
CPC .................................................. G06F 9/5083
USPC ......................................................... 717/121
See application file for complete search history.

(56) References Cited

U.S. PATENT DOCUMENTS

| | | | |
|---|---|---|---|
| 10,232,709 B2 * | 3/2019 | Snyder | B60K 35/00 |
| 2007/0143798 A1 | 6/2007 | Jira et al. | |
| 2014/0106726 A1 | 4/2014 | Crosbie et al. | |
| 2014/0179274 A1 | 6/2014 | O'meara et al. | |
| 2015/0058251 A1 * | 2/2015 | McGinnis | G06Q 10/10 |
| | | | 705/343 |
| 2015/0099495 A1 | 4/2015 | Crosbie et al. | |
| 2015/0121071 A1 | 4/2015 | Schwarz et al. | |
| 2015/0192660 A1 | 7/2015 | Dickow et al. | |
| 2015/0239408 A1 | 8/2015 | Barrett | |

(Continued)

OTHER PUBLICATIONS

International Search Report, dated Feb. 24, 2017, for International Application No. PCT/US2016/068087, 10 pages.

(Continued)

*Primary Examiner* — John Q Chavis

(57) ABSTRACT

Embodiments are directed towards providing a dynamic application environment where separate components of an application can execute on separate processing hardware at any given point in time. A host device monitors current operating characteristics associated with a computing device, such a head unit of an automobile, and based on those characteristics selects which components of one or more applications to execute on the computing device and which components to execute on the host device, if any. The host device provides the selected components to the computing device for execution by the computing device and the host device executes any other components that are not executed by the computing device. The host device monitors the current operating characteristics associated with the computing device, and modifies the selection of which components are executing on which device based on changes in current operating characteristics.

13 Claims, 12 Drawing Sheets

(56) References Cited

U.S. PATENT DOCUMENTS

2015/0334171 A1    11/2015  Baalu et al.
2017/0148350 A1     5/2017  Stankoulov
2017/0210378 A1     7/2017  Gunaratne

OTHER PUBLICATIONS

Irwin, C., "MVC is dead, it's time to Move on," retrieved from https://cirw.in/blog/time-to-move-on on Feb. 19, 2016, 4 pgs.
Stanford CS I 93p, "MVC Controller Model View—Divide objects in your program into 3 'camps,'" retrieved from http://stanford.edu/class/cs75n/1_MVC.pdf on Feb. 19, 2016, 67 pgs (Attached as Parts 1 and 2).

\* cited by examiner

DYNAMIC APPLICATION EXECUTION FOR AUTOMOBILE AND CLOUD HYBRID ENVIRONMENTS

BACKGROUND

Technical Field

The present disclosure relates generally to the dynamic, real-time selection of application components executing on a head unit, while executing other components of the application on a separate host device or in the cloud.

Description of the Related Art

Automobiles are becoming more and more user friendly and interactive. Many new cars are now manufactured with a user interface, called a head unit, which a user can use to control various aspects of the automobile and access a variety of different applications. For example, the user can use the head unit to change radio stations, change the temperature of the automobile cabin, access maps and global positioning systems, access the internet, access other head-unit applications. But these applications often rely on the cellular data of the user's mobile device. It is with respect to these and other considerations that the embodiments described herein have been made.

BRIEF SUMMARY

According to principles as disclosed herein, the various components of a computer application are dynamically allocated to be executed on separate processing devices while the application is running. A device that is being used by a user to interact with an application may be considered to be the device that is running the application, even though various components of the application may be executing on one or more separate devices. For example, an application that runs on a computing device has some components that are executing on the computing device, while other components of the application may be executing on another device, such as a mobile device or in the cloud. Similarly, an application that runs on a mobile device has some components that are executing on the mobile device, while other components of the application may be executed in the cloud, or even on another computing device.

The components of the application that are executed by each separate computing device are dynamically altered while the application is running based on various characteristics associated with the combined execution of the application, which can include the characteristics of the application components themselves, characteristics of the computing devices executing the application components, and characteristics of the communication network between those devices.

In some instances all, or nearly all, of the particular executed application components are executed at single device. The very same application running on a first device may benefit from having some components executed by a second computing device or in the cloud, in which case the second computing device or cloud computing resources execute those components and communicate with the first device. As the application runs, the components are dynamically allocated and can be moved or exchanged from one device to another based on characteristics associated with the execution of the application.

One set of embodiments are directed towards providing a dynamic application environment where separate components of an application can execute on a head unit of an automobile or allocated to execute on a host device or one or more other computing devices that are remote to the automobile. Examples of such remote devices are servers in the cloud, a smartphone or other mobile device, or other computing device that can execute a portion of an application and coordinate that execution with another portion of the application executing on the head unit or other computing devices, thus creating a dynamic environment allocation for execution.

The host device selects which applications to provide to the user of the head unit based on various operating characteristics of the head unit, such as, but not limited to, the user using the head unit, application utilization, geographic location, power being consumed, remaining battery power, etc. Based on the current operating characteristics, the host device selects which components of the selected applications to execute on the head unit and which components, if any, to execute on the various host devices. The host device provides the selected components to the head unit for execution by the head unit and the host device or devices execute any other components that are not executed by the head unit. The host device monitors the current operating characteristics associated with the head unit to determine if a change in the operating characteristics has occurred, and modify the selection of which components are executed by the head unit, which components are executed by the host device, and which components are executed by another computing device, based on those changes.

Embodiments described herein provide an enhanced user experience through the ability of dynamically modifying where application components are executing. Different applications utilize computing resources and networking data differently, and different users experience applications in different ways. By dynamically changing where different components are executing at a given time, a better user experience of the head unit can be achieved. For example, if an application is completely executed in the cloud as the host device, then the amount of data transmitted between the host device and the head unit may increase, which can trigger delays with the display and responsiveness of the application on the head unit, and thus disrupt the user's enjoyment and experience of the application. In contrast, if the application is completely executed by the head unit, the head unit may not be able to support the particular type of applications or the same number of applications at one time due to computing resource limits or constraints of the head unit, which again can reduce the user's enjoyment and experience of the application. By dynamically modifying where application components are executing between a head unit and a host device, application execution speed can be increased while minimizing the network traffic between the host device and the head unit.

BRIEF DESCRIPTION OF THE SEVERAL VIEWS OF THE DRAWINGS

Non-limiting and non-exhaustive embodiments are described with reference to the following drawings. In the drawings, like reference numerals refer to like parts throughout the various figures unless otherwise specified.

For a better understanding of the present invention, reference will be made to the following Detailed Description, which is to be read in association with the accompanying drawings.

DETAILED DESCRIPTION

The following description, along with the accompanying drawings, sets forth certain specific details in order to provide a thorough understanding of various disclosed embodiments. However, one skilled in the relevant art will recognize that the disclosed embodiments may be practiced in various combinations, without one or more of these specific details, or with other methods, components, devices, materials, etc. In other instances, well-known structures or components that are associated with the environment of the present disclosure, including but not limited to the communication systems and networks and the automobile environment, have not been shown or described in order to avoid unnecessarily obscuring descriptions of the embodiments. Additionally, the various embodiments may be methods, systems, media, or devices. Accordingly, the various embodiments may be entirely hardware embodiments, entirely software embodiments, or embodiments combining software and hardware aspects.

Throughout the specification, claims, and drawings, the following terms take the meaning explicitly associated herein, unless the context clearly dictates otherwise. The term "herein" refers to the specification, claims, and drawings associated with the current application. The phrases "in one embodiment," "in another embodiment," "in various embodiments," "in some embodiments," "in other embodiments," and other variations thereof refer to one or more features, structures, functions, limitations, or characteristics of the present disclosure, and are not limited to the same or different embodiments unless the context clearly dictates otherwise. As used herein, the term "or" is an inclusive "or" operator, and is equivalent to the phrases "A or B, or both" or "A or B or C, or any combination thereof," and lists with additional elements are similarly treated. The term "based on" is not exclusive and allows for being based on additional features, functions, aspects, or limitations not described, unless the context clearly dictates otherwise. In addition, throughout the specification, the meaning of "a," "an," and "the" include singular and plural references.

Figure 1A:
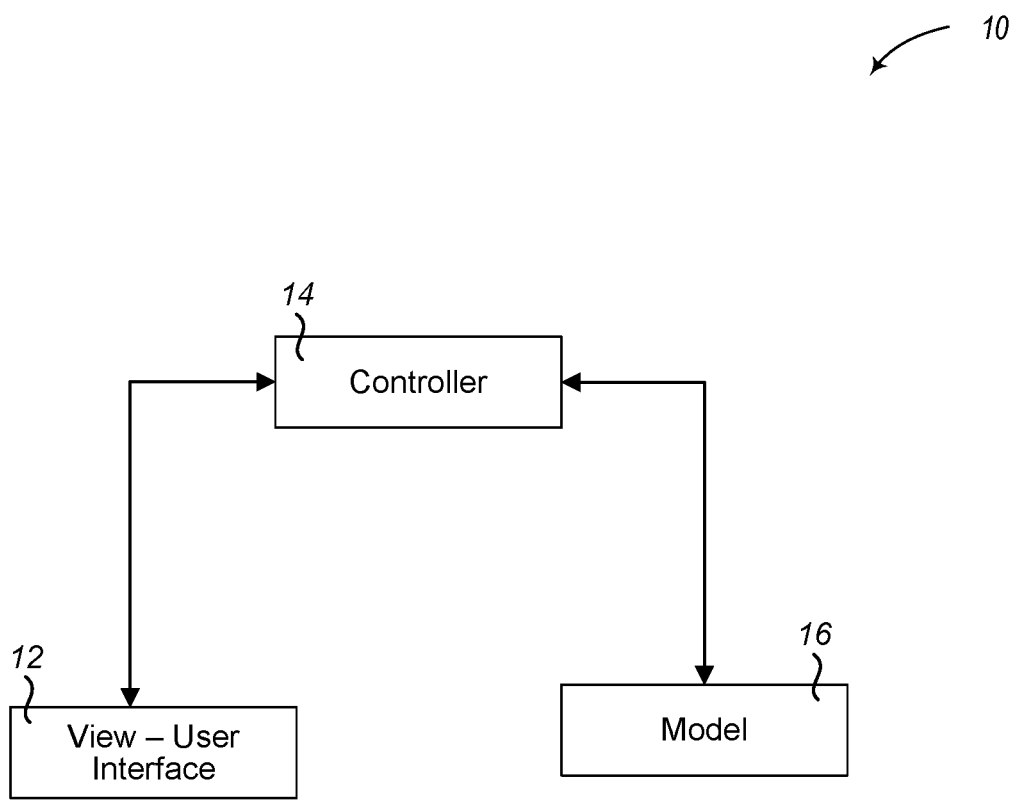
FIG. 1A is a schematic illustrating one example of execution of an application with components separated into different operational units.

FIG. 1A illustrates an application 10 that has components separated into different operational units, objects, or features. According to this embodiment of application 10, the operational units include view components 12, controller components 14, and model components 16. This particular programming structure is well known in the art and is often referred to as the model-view-controller architectural or structural pattern, which has the initials MVC. According to the MVC pattern, an application is a plurality of components, where the components include view components 12, controller components 14, or model components 16. Components of one type can be executed completely independent from the components of other types and operate using completely different code, different structures, and different data types from one another.

View components 12 include one or more components for providing the visual representation of the operation of the application 10. The code of the view components 12 knows how to draw the user interface and handle the interaction with the end user. This user interface is the part of the application that the specific user understands and interacts with. View components 12 can often be modified on their own without impacting other components of the application 10. In particular, view components 12 can be modified for any particular hardware device on which the user interface is to apply, such as a particular model of smartphone, for example, an Apple, Samsung Android-based device; a tablet; local computer; or the like. The code of view components 12 can be frequently modified to support different hardware devices as new hardware devices become available.

Model components 16 include one or more components that encapsulate the data and operational code of the application 10 and define the logic and computation that is used to manipulate and process the data for the application 10. The model components 16 provide not only the storage of data, but in many instances also provide the instruction set for the application 10.

Controller components 14 include one or more components that provide the logic and communications of the application 10. Controller components 14 interact with view components 12 and model components 16. The controller components 14 provide a bridge that separates the data in the model components 16 from the user interface provided by the view components 12. According to this application programming pattern, the view components 12 and the code that operates therein never directly interacts or exchanges data with the model components 16. The controller components 14 have an interface to provide information to respective view components 12 and receive information from the respective view components 12. Similarly, the controller components 14 have an interface to provide information to respective model components 16 and receive information from the respective model components 16.

Further, different portions of the application 10 can be executed at different locations within this programming pattern. Some portions can be executed by one or more controller components 14 and exchange information between those controller components 14 and one or more respective view components 12 or model components 16. Other portions of the application are executed by one or more model components 16 and then passed through one or more respective controller components 14 to one or more respective view components 12, while some portions are executed solely within one or more view components 12.

According to the MVC pattern, each of the view components 12 and the model components 16 can be independently changed without being concerned about the other. In some situations, the controller components 14 may not need to be modified in response to a modified view component 12 or model component 16. In other situations, one or more controller components 14 may be modified to interface with respective modified model components 16 or view components 12, as they are updated and modified.

Typically, view components 12 only interact with controller components 14 and not with model components 16, controller components 14 interact with view components 12 and model components 16, and model components 16 only interact with controller components 14 and not with view components 12. In various embodiments, some components may interact with other components of a same type to interact with other components of other types. For example, a first controller component may interact with a first view component and may also interact with a second controller component that interacts with a second view component. In this way, the first controller component can indirectly interact with the second view component via the second controller component, but may not be able directly interact with the second view component. Although some applications may not strictly adhere to the MVC pattern, an application may still have distinct components that can be executed on different devices using embodiments described herein.

The example shown in FIG. 1A is one example of a programming pattern with distinct components that can be executed on separate computing devices. Another programming pattern will now be provided as a further example.

Figure 1B:
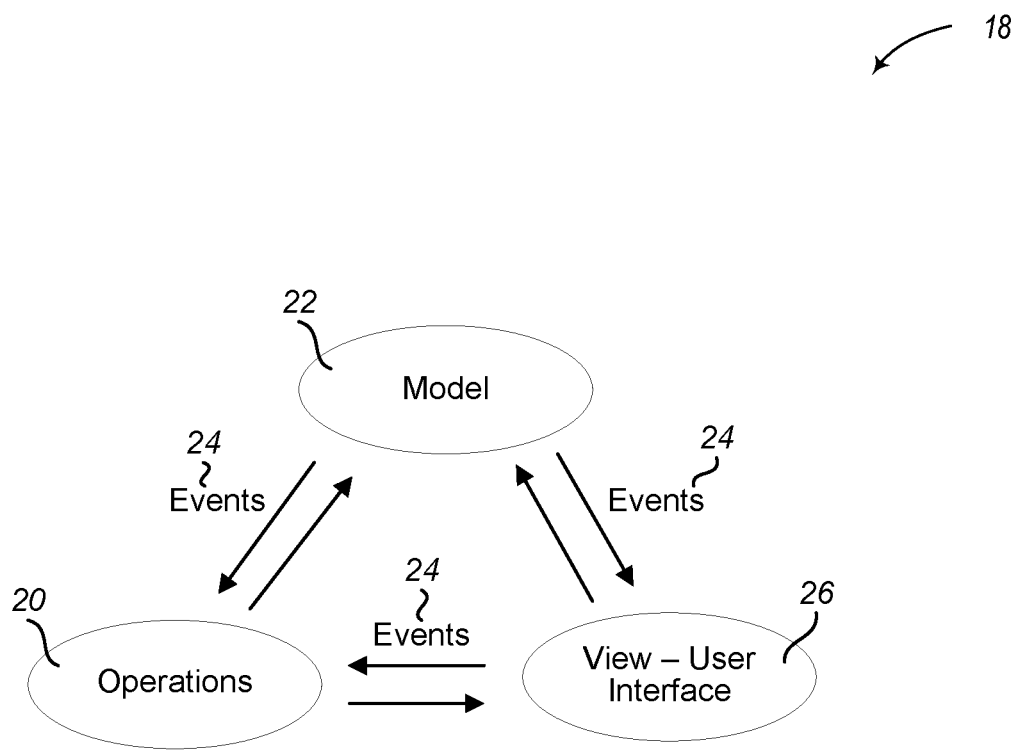
FIG. 1B is a schematic illustrating another example of execution of an application with components separated into different operational units.

Another programming pattern is shown in FIG. 1B, which is somewhat different in concept and operation from what is shown in FIG. 1A. As shown in the schematic of FIG. 1B, application 18 operates on a programming pattern that includes operations components 20, view components 26, model components 22, and events 24. Events 24 are exchanged between the operations components 20, the model components 22, and the view components 26. This particular programming pattern has the acronym MOVE representing model, operations, view, and events. According to this particular programming pattern, the view components 26 provide the user interface. Everything the user can see and interact with is powered by the view components 26. This provides not only the display of the state of the application 18 that is understandable to the user, but also provides the stream of incoming user interactions in a meaningful way to receive information from the user and transmit events 24 to other components. The view components 26 will emit events 24 to the operations components 20 or the model components 22 and will wait for changes by looking for events 24 from the model components 22 or the operations components 20.

An event 24 is emitted whenever the user interacts with a view component 26. By watching for and interacting with events 24, the operations components 20 and the model components 22 can be aware of the interaction of the view and the components can be coupled together without interfering with each other. The operations components 20 can provide instruction sets, exchange data, and provide allocation of computing power based on the events 24 that are exchanged between the various types of components. This application 18 of FIG. 1B is a different programming pattern than that shown in FIG. 1A and is provided as an illustration that the inventive embodiments as described herein can be used with very different programming patterns.

There are many different types of programming patterns that exist now or will be created and used in the future. An example of two different programming patterns are provided as an illustration to show that the inventive embodiments can be carried out by any of the programming patterns that have components that can be executed on separate devices independent of one another. Various other examples of programming patterns are applicable to the embodiments as described herein, as will be apparent to those of skill in the art and are not described further herein, since these various programming patterns will be known to those of skill in the art.

Figure 2A:
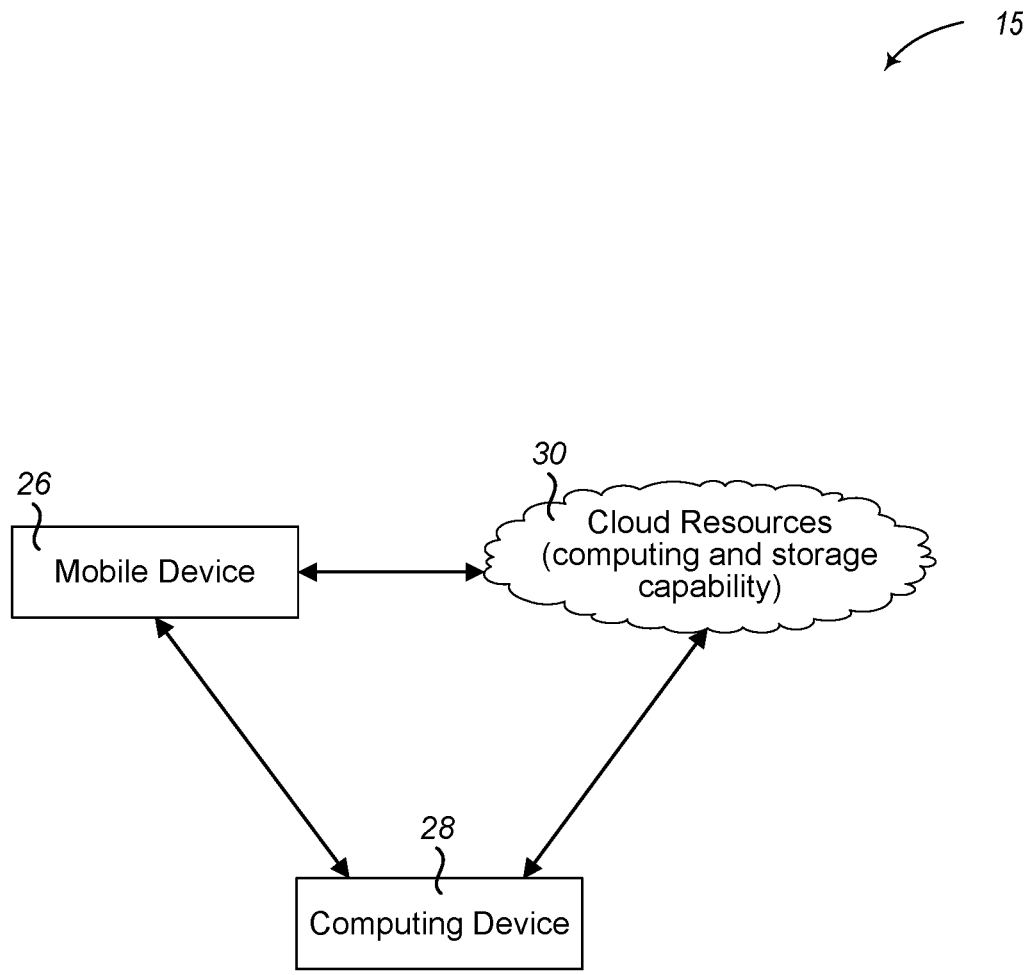
FIG. 2A is a schematic illustrating hardware components that can execute the various components of the application of FIGS. 1A and 1B.

FIG. 2A illustrates a hardware system 15 in which an application, such as application 10 in FIG. 1A or application 18 in FIG. 1B, may be run. This hardware system 15 includes a mobile device 26, a computing device 28, and cloud resources 30. It should be recognized that, in some embodiments, system 15 may include mobile device 26 and computing device 28 but not cloud resources 30. Similarly, in other embodiments, system 15 may include computing device 28 and cloud resources 30 but not mobile device 26. And in yet other embodiments, system 15 may include mobile device 26 and cloud resources 30 but not computing device 28.

The mobile device 26 includes any mobile device capable of executing at least a portion of an application. Examples of mobile device 26 include, but are not limited to, laptop computers, smart phones, tablet computers, smart watches, other wearable computing devices, other smart devices, or other handheld computing devices. As can be appreciated, the mobile device 26 is battery operated and has a limited amount of battery power. The mobile device 26 may also have limited processing and memory capability. It may have, for example, a single processor to execute the application, or it may not have large graphics capability or the ability to compute complex mathematical equations at a high rate of speed, or the processing capability may be reduced to save battery power.

The computing device 28 is one or more computing devices that are separate from the mobile device 26. The computing device 28 may be a personal computer, another mobile device, or other source of additional processing power. For example, in some embodiments, the computing device 28 is a head unit of an automobile, such as described in conjunction with FIGS. 2B and 3A-3E. In other embodiments, the computing device 28 is a home computer of a user of the mobile device 26. One of the aspects of the computing device 28 is that it has an additional power supply, which may include being plugged into mains power or the power grid or having its power supplemented by a generator, such as an alternator used to recharge a car battery when powering a head unit. So the amount of power available to the computing device 28 can be considered constant and unlimited, and the computing device 28 can be considered to never run out of power, at least relative to mobile device 26. Additionally, the computing device 28 includes additional memory and processing power beyond that of the mobile device 26. For example, the computing device 28 may have one or more advanced processors that have very high capability to execute complex code and may have the capability to execute multiple processes in parallel. But the memory and processing of computing device 28 may still be limited in some situations.

The cloud resources 30 include one or more computing devices, such as server computers, that are remote to the mobile device 26 and the computing device 28 and provide or allocate processing capability and storage capability for use by a plurality of devices. Interaction with the cloud 30 is done over various connection routes, such as wireless, internet, cable, or other transmission line. The cloud 30 can be considered to have unlimited computing power, unlimited storage capacity, and constant electrical power that will never fail, at least relative to computing device 28 and mobile device 26.

An application may completely reside on just one of these devices, or the application can be spread around to multiple devices of any of these types of devices. In particular, some applications reside solely on the computing device 28. All components of the application are stored on and executed solely within the computing device 28. Similarly some applications reside solely on the mobile device 26, where all portions of the application are stored on and execute solely within the mobile device 26.

In other embodiments, the computing device 28 may interact with the mobile device 26, or the cloud 30, or both to run the application. In this instance, some but not all of the code of the application is executing on the computing device 28 and the remainder of the code is executing on the mobile device 26, the cloud 30, or distributed between the mobile device 26 and the cloud 30. In this way, some components of the application are executing on the computing device 28 while other components of the application are executing on the mobile device 26 or the cloud 30. Similarly, in other embodiments, the mobile device 26 may interact with the computing device 28, or the cloud 30, or both to run the application. In this instance, some but not all of the code of the application is executing on the mobile device 26 and the remainder of the code is executing on the computing device 28, the cloud 30, or distributed between the computing device 28 and the cloud 30. In this way, some components of the application are executing on the mobile device 26 while other components of the application are executing on the computing device 28 or the cloud 30.

Different portions or components of the application can be dynamically allocated to operate on any one of the particular hardware devices, whether the mobile device 26, the computing device 28, or the cloud 30, or some combination thereof. In some embodiments, one of these devices may be used to allocate and distribute the different application components to the various devices. This device may be referred to as the host device and may monitor operating characteristics of the various devices and the execution of the application to determine how to modify which components are executing on which device.

As mentioned above, the computing device 28, the mobile device 26, and the cloud 30 have different processing, memory, and electrical power capabilities. Similarly, the capabilities and bandwidth of the network communications between the devices and systems can be different. For example, the mobile device 26 and the computing device 28 may communicate with each other via a wireless local area network, such as Bluetooth, whereas the mobile device 26 and cloud 30 may communicate with each other via a cellular network. And computing device 28 and cloud 30 may communicate with each other via another communication network, such as a separate cellular network, the internet, or other network technologies.

The processing, memory, electrical power, and networking capabilities can vary over time due to a number of different circumstances, such as number of applications executing on a device; network congestion or slow transmission times; diminished power supply, such as a low battery; usage of the applications; etc. As these characteristics and capabilities change, so too can the location of where components are executing.

For example, the battery power available to the mobile device 26 may fluctuate from time to time from being full power available to nearly out of power. When the mobile device 26 is nearly out of power, its internal operations may limit which applications or which portions of particular applications may execute thereon in order to save any remaining battery power to keep other portions of the mobile device 26 active. In this instance, portions of the application may be moved from the mobile device 26 to and executed on the computing device 28 or the cloud 30. In this way, the mobile device 26 may consume less power by receiving data from another system that is executing that portion of the application compared to the mobile device 26 executing that portion of the application itself. Similarly, if the battery of the mobile device 26 begins to charge, then the previously moved portion of the application may be moved back to the mobile device 26 for execution by the mobile device 26.

In another example, if the computing device 28 communicates with the cloud 30 via a cellular network connection and it is approaching its maximum monthly data plan transmission limit, a portion of the application executing in the cloud 30 may be moved to back to the computing device 28. In this way, more of the processing is being performed locally at the computing device 28, which can reduce the amount of data transmitted over the cellular network in an attempt to not exceed the computing device's data-plan limit. Similarly, some of the processing may be moved to the mobile device 26, where the mobile device 26 can transmit data to the computing device 28 via a wireless local area network, which again can reduce the amount of data transmitted over the cellular network using the computing device's data plan, while still providing additional processing capacity for at least a portion of the application.

It should be recognized that any combination of changes in processing, memory, electrical power, networking capabilities, or any other operating characteristics in any of the devices as an application is running can be used to determine how to dynamically change, allocate, and distribute which application components are executing on which device at any given point in time.

Various embodiments will now be described, in which the hardware illustrated in FIG. 2A is explained with respect to different operational environments. One possible environment is an automobile, where the automobile includes a head unit as the computing device 28 and a user may or may not have a mobile device 26. Another possible environment is a hotel setting, where the hotel includes the computing device 28 and one or more mobile devices 26 are provided by individual users or hotel guests. Other possible embodiments include that of a ship, an aircraft, a home, or other situations in which a computing device 28, mobile device 26, or cloud 30 have separate power and computing resources but can interact with each other to dynamically change which device is executing different portions of an application to provide a user with an experience as if the entire application is being executed on a single device being used by the user.

Figure 2B:
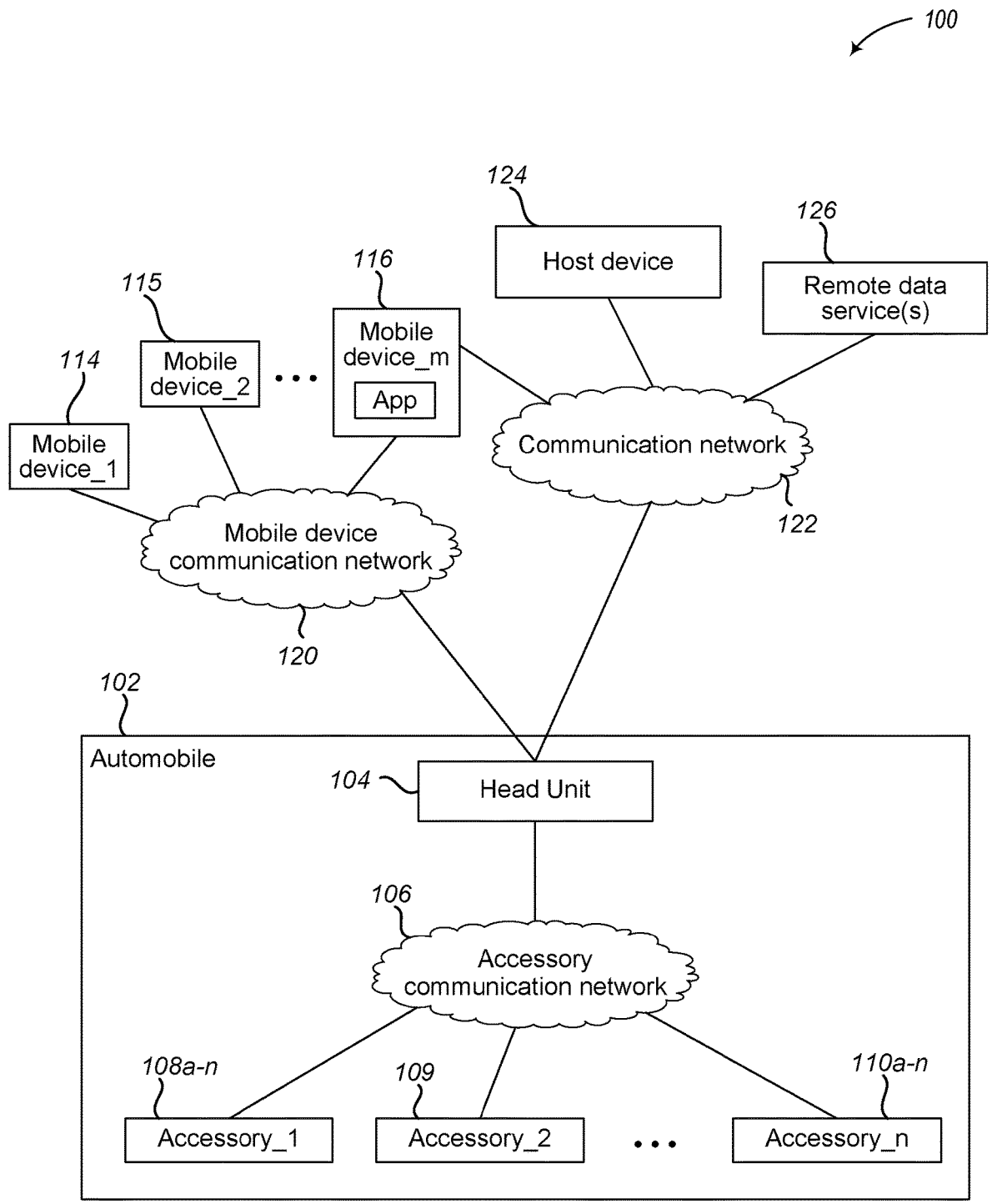
FIG. 2B illustrates a context diagram of an automobile environment that utilizes a host device that is remote to an automobile head unit to manage applications executing on the head unit in accordance with embodiments described herein.

FIG. 2B illustrates a context diagram of an automobile environment that utilizes a host device that is remote and separate from an automobile head unit to manage applications executing on the head unit in accordance with embodiments described herein. System 100 includes an automobile 102 and a host device 124. In some embodiments, the system 100 also includes a plurality of mobile devices 114-116 and remote data service(s) 126.

The automobile 102 is virtually any vehicle that includes a head unit 104. Although this description primarily refers to automobiles, similar embodiments may also be employed in aerial vehicles, water vessels, railroad vehicles, and other modes of transportation that include a head unit, or even other non-transportation environments, such as a home, hotel, or other building.

The head unit 104 is a computing device in an automobile that provides interactive controls and user interface to a user or occupant of the vehicle. As used herein, the terms user and occupant are interchangeable and refer to any person interacting with the head unit 104 or the automobile 102. The head unit 104 is utilized to access one or more applications or interact with one or other more accessories 108-110. In some embodiments, head unit 104 is an embodiment of computing device 28 in FIG. 2A. In various embodiments, the head unit 104 can display accessory data, or it can provide accessory data to other devices, such as to mobile devices 114-116 or other accessories.

In various embodiments, the head unit 104 includes a user interface that enables a user to access one or more applications, also referred to as head unit applications. In some embodiments, the applications may be one or more of accessories 108-110. Each application includes a plurality of components that interact with one another to collectively perform the functionality of the application. In some embodiments, at least a subset of the components is portable and can be executed on a device that is separate from another device that is executing other components of the same application. In some embodiments, one or more applications are architected in a model-view-controller structure, such as application 10 in FIG. 1A, with at least one view component, at least one model component, and at least one controller component. Other applications may include other architectures, such as model, operations, view, and events structure illustrated by application 18 in FIG. 1B; other types of applications with independent components; or other types of non-separable application architectures.

In some embodiments, an entire application is executing on the head unit 104. In other embodiments, only a subset, and not all, of the application components are executing on the head unit 104 and the rest of the application components are executing on the host device 124. For example, the view components of an application may be executed on the head unit 104, while the model components and controller components may be executed on the head unit 104 or the host device 124, or a combination thereof, depending on the current operating characteristics associated with the head unit 104. Briefly, the operating characteristics may include, but are not limited to, a location of the automobile, a current load on the head unit, a user interacting with the head unit, utilization of a plurality of applications by the user, network connectivity, data utilization by the application, or other operating aspects of the head unit. It should be recognized that if an application does not have components that can execute on separate devices, then the application may completely execute on the head unit 104 or the host device 124.

As the current operating characteristics change over time, the set of components that are executing on the heat unit 104 may also change in response to changes in the current operating characteristics. For example, when the automobile is first turned on, the host device 124 determines an initial set of current operating characteristics, such as who is the driver of the automobile. And based on those determined characteristics, the host device 124 selects one or more applications to provide to the driver. For this example, assume the host device 124 selects application_A, which has the following components: VC_A, VC_B, MC_A, MC_B, CC_A, and CC_B, where the VC components are view components, the MC components are model components, and the CC components are controller components. The host device 124 may, based on the operating characteristics, select and provide VC_A, VC_B, and CC_A to the head unit 104 for execution by the head unit 104, MC_A, MC_B, and CC_B remain on the host device 124 and are executed by the host device 124. At some later point in time, the operating characteristics associated with the head unit 104 might change. In response to this change, the host device 124 may notify the head unit 104 to halt execution of CC_A, at which time the host device 124 can begin executing CC_A. At this point, the head unit 104 is executing VC_A and VC_B and the host device 124 is executing MC_A, MC_B, CC_A, and CC_B. Another change in the operating characteristics may occur, and the host device 124 may provide all components of the application to the head unit 104 for execution by the heat unit 104. As a result, the head unit 104 is executing VC_A, VC_B, MC_A, MC_B, CC_A, and CC_B, and the host device 124 is not executing any components of the application. Selection of which components are executing on the head unit 104 and which components are executing on the host device 124, or even executing on another device, may dynamically change in real time as the operating characteristics associated with the head unit 104 change over time.

The host device 124 is any computing device, such as a server computer, cloud resources, a smartphone or other mobile device, or other computing device, which is remote to the automobile that can monitor the operating characteristics associated with the head unit environment and dynamically change which application components are executing on the head unit 104 or other computing devices. In various embodiments, the host device 124 may be mobile device 26, cloud resources 30, or another computing device 28 described in FIG. 2A. As described herein, the application components not executing on the head unit 104 are executed on the host device 124, or some other device selected by the host device 124. Although the host device 124 is illustrated as a single device, embodiments are not so limited. Rather, the host device 124 may be one or more computer devices that collectively perform functions of dynamically managing head unit application components in real time. In various embodiments, the host device 124 may include cloud computing technologies that are accessible via the internet.

Remote data service(s) 126 may include one or more application data services that provide data or other information to an application, or application component executing on the head unit 104 or the host device 124. For example, a component executing on the head unit 104 may request music data from a remote data service 126. The remote data service 126 returns the requested data to the head unit 104. In another example, a component executing on the host device 124 may request the music data from the remote data service 126. The remote data service 126 returns the requested data to the host device 124, which in turn utilizes the data in executing the application or provides it to the head unit 104 for use by components executing on the head unit 104. Examples of remote data service(s) 126 may include services that maintain map data, music or other content, game data, or other types of information that may be requested by an application.

The host device 124, the head unit 104, and the remote data service(s) 126 communicate with each other via a communication network 122. The communication network 122 is configured to couple various computing devices to transmit data from one or more devices to one or more other devices. Communication network 122 includes various wireless networks that may be employed using various forms of communication technologies and topologies, such as, but not limited to, cellular networks, mesh networks, or the like. In various embodiments, an application component, whether executing on the head unit 104 or the host device 124, may request data from a remote data service 126 using communication network 122, and the remote data service 126 may provide the requested data to the host device 124 or the head unit 104 via the communication network 122.

The head unit 104 can also provide user access to accessories 108-110. The accessories 108-110 can include any automobile utility or device that is controllable by the user. Examples of these accessories include, but are not limited to, adjustable seats, sun roof, side mirrors, rear-view mirror, air conditioner, power windows, or other controllable features of the automobile 102. Accessories 108-110 also include virtually any automobile utility or device that provides information or data to the user. Examples of these accessories include, but are not limited to, speedometer, odometer, oil pressure gauge, temperature gauge, or other automobile sensors that provides information to a user of the automobile. Accessories 108-110 further include head unit applications. Examples of these accessories include, but are not limited to, navigation, audio and radio controls, television or music applications, environmental control applications, automobile performance or maintenance applications, or other applications. It should be noted that some accessories may only output data, some accessories may only receive controls to manipulate the accessory, and some accessories may input and output data. For example, a speedometer may only output the current speed of the automobile; a power window may only receive controls to move the window up or down, but not return any information to the head unit; and the navigation system may receive controls for a destination and also return a suggested travel route to the destination. It should be noted that these examples are non-exhaustive and other types of accessories may also be employed.

The head unit 104 communicates with the accessories 108-110 via an accessory communication network 106. The accessory communication network 106 is configured to couple the accessories 108-110 with the head unit 104 to transmit content/data between the accessories 108-110 and the head unit 104. The information communicated between devices may include current accessory status or data, accessory control data, video data, voice data, image data, text data, or other types of content, data, or information. The accessory communication network 106 may include one or more physical networks; one or more wireless communication networks; one or more application program interfaces; or one or more other networks capable of transmitting data from one accessory to another, from an accessory to the head unit 104, or from the head unit to an accessory; or some combination thereof depending on the types of accessories communicating with the head unit 104. For example, the accessory communication network 106 may include an automotive body communication network, such as a wired controller area network, short range wireless communication network, such as personal area networks utilizing Bluetooth Low Energy protocols, or any other type of network.

In some embodiments, a user may be able to utilize a mobile device, such as mobile device 114-116 to interact with the head unit 104 or the accessories 108-110. In some embodiments, the mobile devices 114-116 may be embodiments of mobile device 26 in FIG. 2A. The mobile devices 114-116 include any mobile device capable of communicating with a head unit 104 of the automobile 102. The mobile devices 114-116 are structured to send and receive content and controls to and from the head unit 104. Examples of mobile devices 114-116 include, but are not limited to, laptop computers, smart phones, tablet computers, wearable computing devices, other smart devices, or other handheld computing devices.

The head unit 104 communicates with the mobile devices 114-116 via a mobile device communication network 120. The mobile device communication network 120 is configured to couple the mobile devices 114-116 with the head unit 104 to transmit content/data between the mobile devices 114-116 and the head unit 104. The information communicated between devices may include current accessory status or data, requests to access accessory data, requests to control or modify an accessory, video data, voice data, image data, text data, or other types of content, data, or information. The communication network 120 may include a variety of short-range wireless communication networks, such as personal area networks utilizing classic Bluetooth or Bluetooth Low Energy protocols, an IR optical network, or network 120, to enable communication between the mobile devices 114-116 and the head unit 104.

In various embodiments, the communication network 122, the mobile device communication network 120, and the accessory communication network 106 are separate communication networks. As described herein, the host device 124 and the head unit 104 can communicate directly with each other via communication network 122 without utilizing mobile devices 114-116. Although in some embodiments where the head unit 104 does not have access to communication network 122, mobile device 116 may be utilized as an intermediary device between the head unit 104 and the host device 124 or the remote data service(s) 126. In such an embodiment, the head unit 104 may communicate with mobile device 116 via mobile device communication network 120 and the mobile device 116 can communicate with the host device 124 and the remote data service(s) 126 via communication network 122. In some other embodiments, The host device 124 may perform the same functionality as described herein with respect to selecting which components execute on the head unit 104 and which components execute on the host device 124, but the host device 124 may provide the components selected for execution on the head unit 104 to mobile device 116, which may forward those components to the head unit 104.

In some embodiments, the host device 124 may be one of mobile devices 114-116 such that the mobile device is the computing device selecting which components are executing on the head unit and which components are executing on the mobile phone. In other embodiments, the techniques described herein may be employed between the host device 124 and the mobile device 116. In at least one such embodiment, the host device 124 may monitor the operating characteristics associated with the mobile device 116 and dynamically change which application components are executing on the mobile device 116 in accordance with embodiments described herein, but for applications on the mobile device 116 rather than the head unit 104. In yet other embodiments, the techniques described herein may also be employed to determine which components to execute on a combination of the head unit, the mobile device, and the host device. In some embodiments, each device that is executing at least one component of an application may include a specialized application or operating system to coordinate the communication between components executing on separate devices.

Figure 3A:
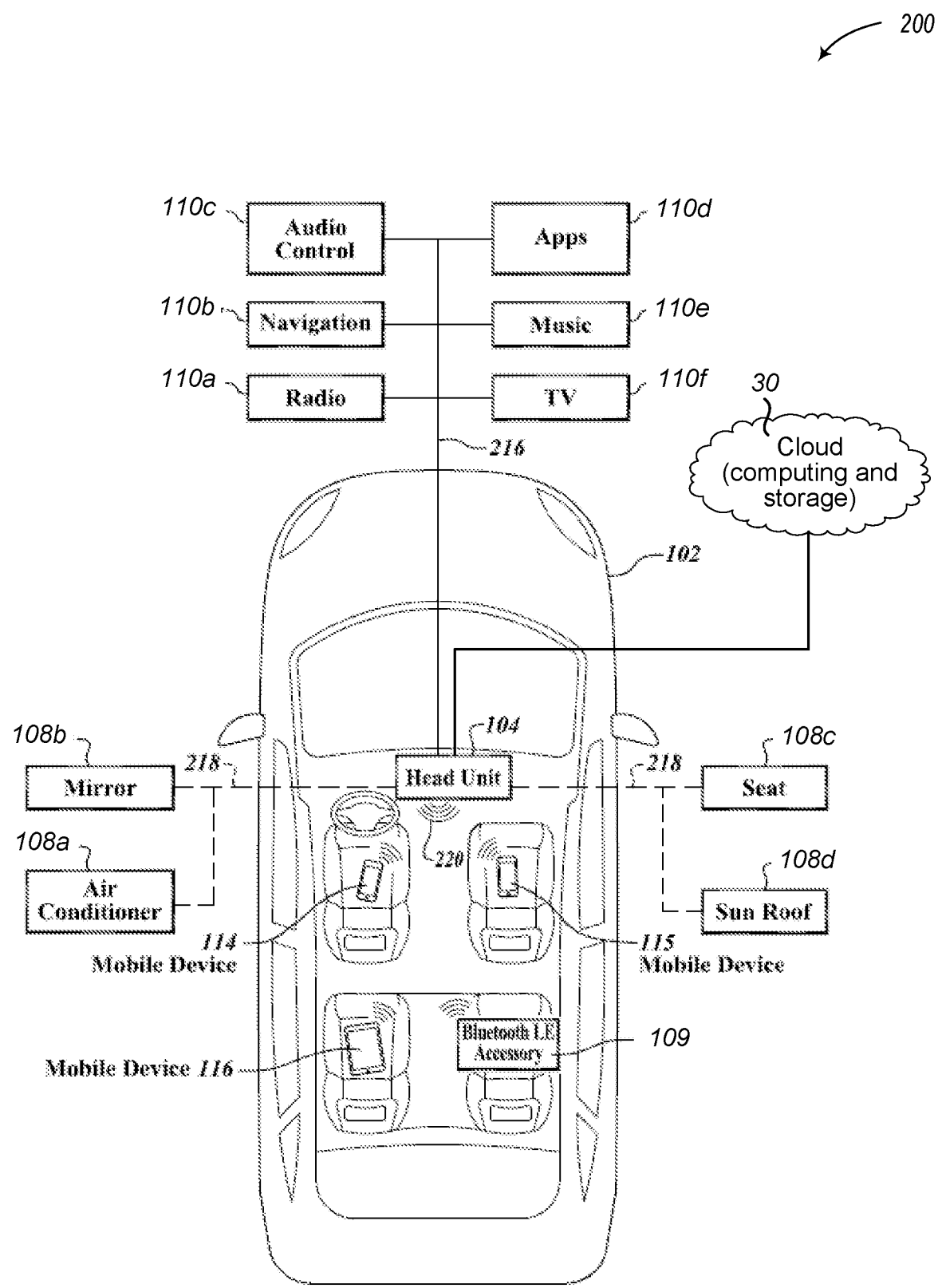
FIG. 3A shows a use case example of an automobile system that includes user mobile devices, a head unit, and various accessories in accordance with embodiments described herein.

FIG. 3A shows a use case example of an automobile system. The system includes an automobile 102, a head unit 104, and a plurality of different accessories. The illustrated accessories are examples of the accessories 108-110 in FIG. 2B. The accessories include body accessories 108a-108d, infotainment accessories 110a-110f, and wireless accessories 109.

The body accessories 108a-108d are accessories that communicate with the head unit 104 via an automotive body communication network 218. The automotive body communication network 218 may be a controller area network bus that physical connects the body accessories 108a-108d to the head unit 104. Examples of body accessories 108a-108d include, but are not limited to, air conditioner 108a, adjustable mirror 108b, adjustable seat 108c, and sun roof 108d.

The infotainment accessories 110a-110f are accessories that are embedded in or executed by the head unit 104, such as software programs and functions, and communicate with the head unit 104 via infotainment network 216. The infotainment network 216 may be one or more application program interfaces that enable the head unit 104 to communicate with the various infotainment accessories 110a-110f. Examples of infotainment accessories 110a-110f include, but are not limited to, radio 110a, navigation 110b, audio controls 110c, applications 110d, music 110e, and television 110f, or other applications not illustrated.

The wireless accessories 109 include other accessories that communicate with the head unit 104 via a wireless network 220, such as Bluetooth Low Energy or other short range wireless protocol. Although the wireless accessory 109 is illustrated in a back seat of the automobile 102, embodiments are not so limited, and the wireless accessory 109 can be positioned in other locations of the car and may provide control of other accessories.

In various embodiments, the automotive body communication network 218, the infotainment network 216, and the wireless network 220 for communicating with wireless accessory 109 are part of the accessory communication network 106 of FIG. 1.

The mobile devices 114-116 can provide requests to the head unit 104 to access or control one or more of the body accessories 108a-108d, the infotainment accessories 110a-110f, the wireless accessories 109, or some combination thereof. In some embodiments, the mobile devices 114-116 can receive accessory data without sending a request to the head unit 104. In such an embodiment, the head unit 104 may obtain accessory data, which is broadcast from the accessory or requested from the accessory by the head unit, and broadcasted or transmitted via wireless network 220. The mobile devices 114-116 can listen for this broadcasted data from the head unit 104.

FIGS. 3B-3E show example system diagrams of a host device and head unit in accordance with embodiments described herein. System 300 in FIGS. 3B-3E includes host device 124 and head unit 104. The host device 124 and head unit 104 communicate via communication network 122.

Figure 3B:
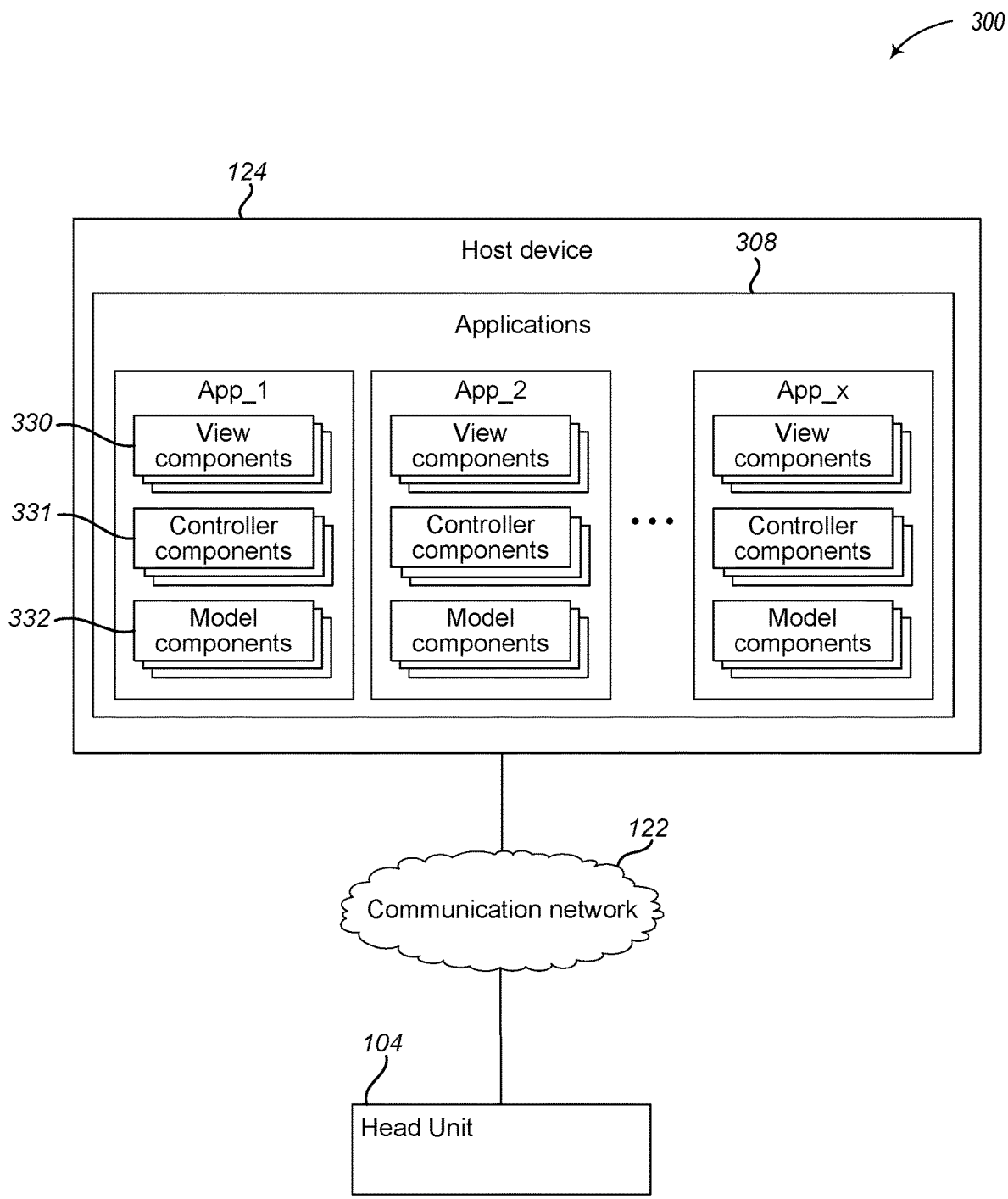
FIGS. 3B-3E show example system diagrams of a host device and head unit in accordance with embodiments described herein.

As illustrated in FIG. 3B, the host device 124 stores a plurality of applications 308. Each application 308 includes a plurality of components 330-332. As described herein, the applications 308 may be architected in a view-model-controller structure with one or more view components 330, one or more model components 331, and one or more controller components 332. However, embodiments are not limited to applications designed with the view-model-controller structure. Rather other application designs may also be utilized so long as some components are autonomous to one another and may be executed on separate devices. In various embodiments, an application may include other components, such as components that may need to be executed on a same device, components that may need to be executed on the host device 124, or components that may need to be executed on the head unit 104, or any combination thereof.

As described herein, the host device 124 dynamically determines which applications are provided to the head unit 104 and which components of those applications are executed on the head unit 104 and which are executed on the host device 124 based on changes in the current operating characteristics associated with the head unit 104.

Figure 3C:
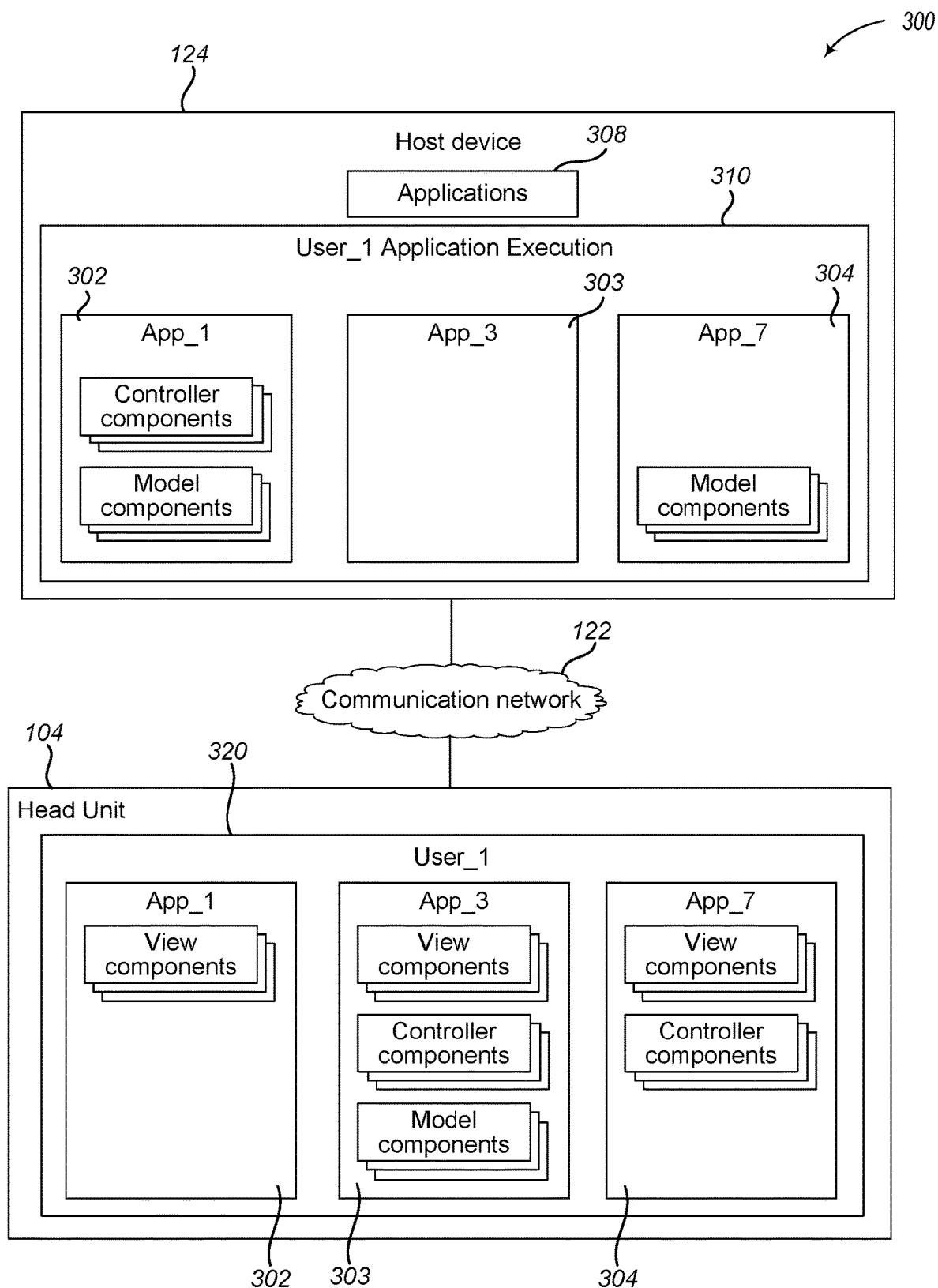

In the illustrated example shown in FIG. 3C, a first user 320 is using the head unit 104. By employing embodiments described herein, the host device 124 determines applications 310 for execution for the first user. In this illustration, applications 310 include applications 302-304. The host device 124 selects applications 302-304 to be provided to the head unit 104. Of those selected applications, the host device 124 selects and provides to the head unit 104 the view components of application 302; the view components, the model components, and the controller components of application 303; and the view components and the controller components of application 304. The head unit 104 executes each of these components while the host device 124 executes the model components and the controller components of application 302 and the model components of application 304. In the illustrated embodiment, each of the different types of components is executed on a same device. For example, all controller components of application 303 are executed on the head unit 104. Embodiments, however, are not so limited, and one or more components of a given type may be executed by the head unit 104 and other components of the given type may be executed by the host device 124, such as is illustrated in FIG. 3D.

As described herein, the host device 124 may identify a change in the current operating characteristics of the head unit 104. In response to those changes, the host device 124 can change the selection of which components are executing on the head unit 104, and which components are executing on the host device 124.

Figure 3D:
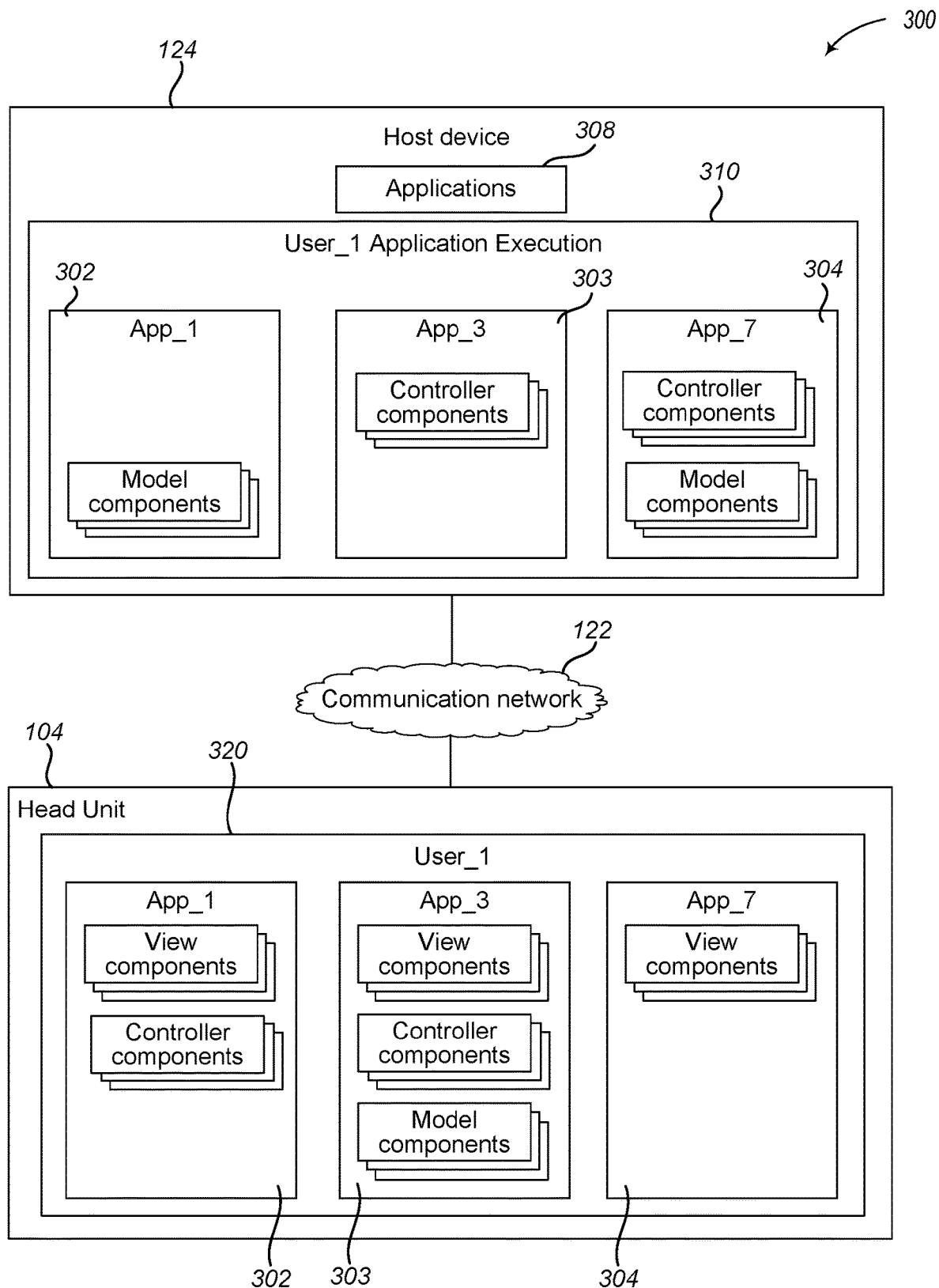

As illustrated in FIG. 3D, the host device 124 again selects and provides applications 302-304 to the head unit 104. But due to the change in operating characteristics, the host device 124 moves execution of the controller components of application 302 from the host device 124 to the head unit 104, and moves execution of the controller components of application 304; the model components of application 303; and some, but not all, of the controller components of application 303 from the head unit 104 to the host device 124. As a result, the host device 124 selects and provides to the head unit 104 the view components and the controller components of application 302; the view components, the model components, and a subset of the controller components of application 303; and the view components of application 304. The head unit 104 executes each of these components while the host device 124 executes the model components of application 302, a different subset of the controller components of application 303; and the model components and the controller components of application 304. In this illustration, the controller components of application 303 are executing on different devices, some are executed by the head unit 104, and others are executed by the host device 124.

Figure 3E:
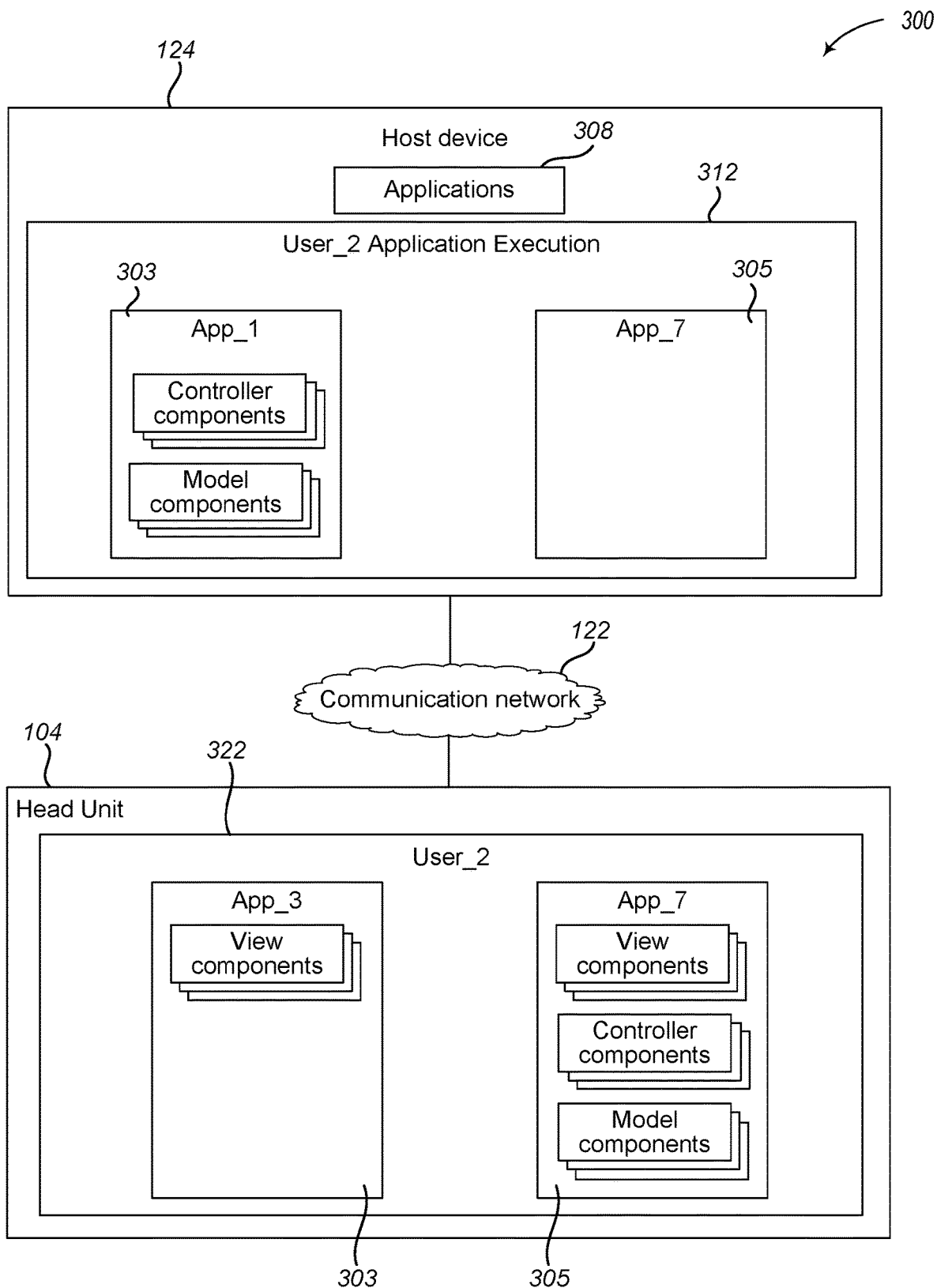

FIG. 3E illustrates another example of components of applications executing on the head unit 104 or the host device 124, or some combination thereof as a result of changing operating characteristics of the head unit 104. In this example, the user of the head unit 104 changes from the first user to a second user 322. By employing embodiments described herein with the change in user, the host device 124 determines applications 312 for execution for the first user. In this illustration, applications 312 include applications 303 and 305. The host device 124 selects applications 303 and 305 to be provided to the head unit 104. Of those selected applications, the host device 124 selects and provides to the head unit 104 the view components of application 303 and the view components, the model components, and the controller components of application 305. The head unit 104 executes each of these components while the host device 124 executes the model components and the controller components of application 303.

The above example automobile environment is not to be construed as limiting and other operational environments may also be used in employing embodiments described herein to dynamically allocate application components between multiple computing devices. Also, the use of view, model, and controller components in the above examples is not to be construed as limiting and other architectural patterns with distinct components that can execute on separate devices and dynamically change on which device they are executing may also be used in employing embodiments described herein.

The operation of certain aspects of the disclosure will now be described with respect to FIGS. 4 and 5. In at least one of various embodiments, processes 400 and 500 described in conjunction with FIGS. 4 and 5, respectively, may be implemented by or executed on one or more computing devices, such as host device 124, computing device 28, mobile device 26, or cloud 30.

Figure 4:
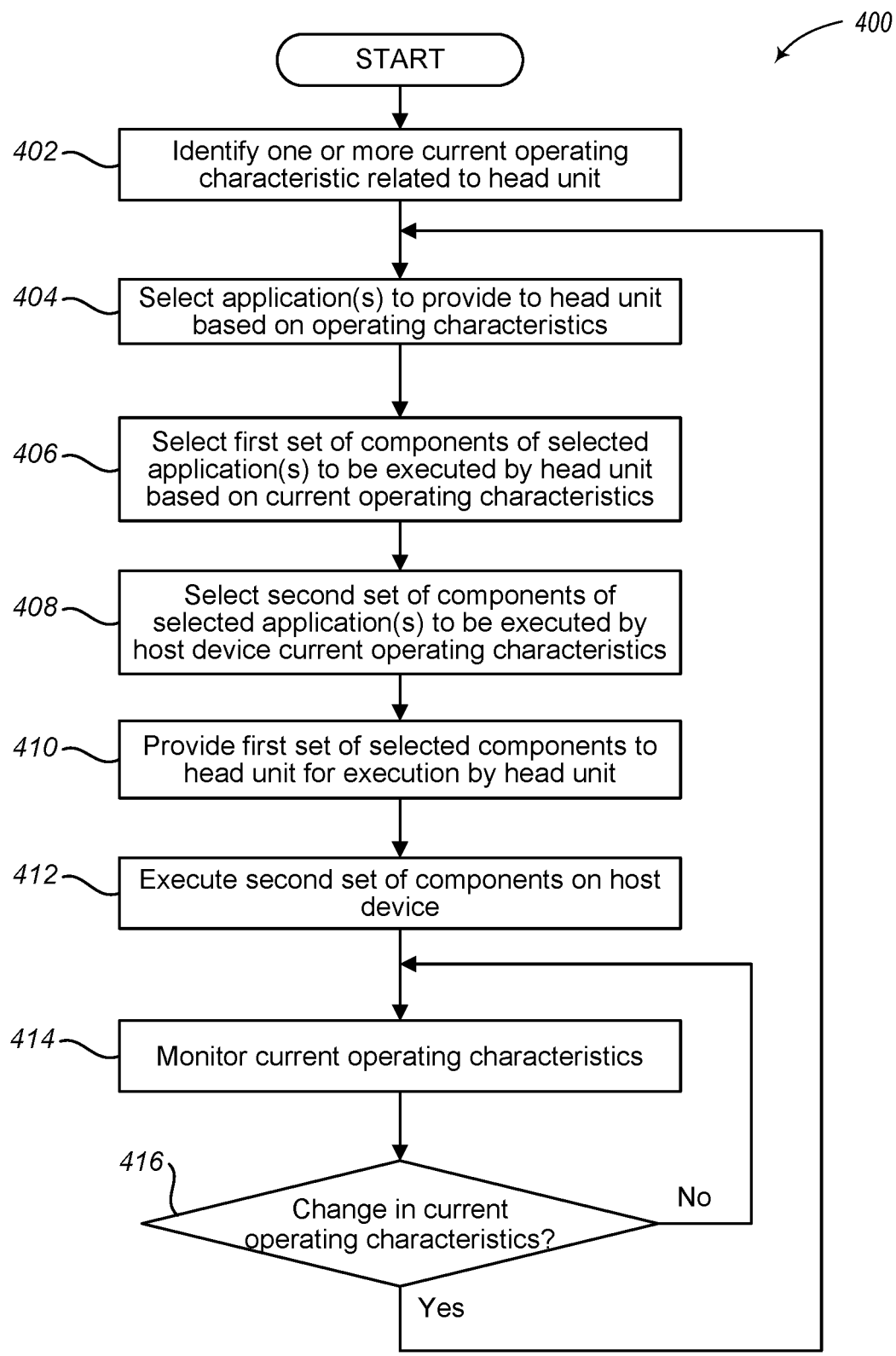
FIG. 4 illustrates a logical flow diagram generally showing one embodiment of an overview process for dynamically modifying which application components are executing on the head unit and which components are executing on the host device in accordance with embodiments described herein.

FIG. 4 illustrates a logical flow diagram generally showing one embodiment of an overview process for dynamically modifying which application components are executing on the head unit, such as head unit 104 and which components are executing on the host device in accordance with embodiments described herein. Process 400 begins, after a start block, at block 402, where one or more current operating characteristics related to the head unit are identified. The operating characteristics include aspects of the head unit that could impact how the head unit is operating or who is using the head unit. Non-limiting examples of the operating characteristics include, a location of the automobile, a current load on the head unit, a user interacting with the head unit, utilization of a plurality of applications by the user, network connectivity, network congestion or latency, data utilization by the application, electrical power utilization or capacity, or other operating aspects of the head unit or the application. One or more of a plurality of operating characteristics, or some combination of operating characteristics, can be utilized at any point in time to identify the current operating characteristics of the head unit.

Process 400 proceeds to block 404, where one or more applications are selected from a plurality of applications to provide to the head unit. In various embodiments, the application is provided to the head unit when the first set of selected components is provided to the head unit at block 410. Nevertheless, the selected application(s) are applications that are currently available on the head unit for use by the user and non-selected applications are currently not available for use on the head unit by the user. An application that is currently available for use is an application that a user can interact with as if the application is fully executing on the head unit. In various embodiments, the host device may store a plurality of applications, but only a subset of those applications may be provided to the head unit and accessible to the user at any given time. These accessible applications are the currently available applications to the user.

In various embodiments, applications are selected based on the current operating characteristics identified in block 402. For example, User_A may use a key fob that is associated with an identifier of User_A to start the automobile. The head unit may provide the identifier to the host device. The host device can use the identifier to select a profile of User_A. The profile may indicate that of applications 1, 2, 3, and 4, User_A prefers applications 2 and 4; accordingly the host device selects applications 2 and 4 to provide to the head unit. Various other current operating characteristics or combinations of operating characteristics may be utilized to select one or more applications. For example, in some embodiments, a user can manually select one or more applications to use on the head unit or remove from the head unit.

Process 400 continues at block 406, where a first set of components of the selected application(s) are selected to be executed by the head unit. Each application includes a plurality of components. In some embodiments, some components may be allowed to execute on separate computing devices from one another. In other embodiments, some components may be required to be on a same computing device. And in yet other embodiments, some components may be required to execute on the computing device that is rendering final images of the application to the user. In various embodiments, the application may be architected in a view-model-controller structure with one or more view components, one or more model components, and one or more controller components. In some embodiments, the selected components include at least one or all of the view components of the selected application(s) and all, some, or none of the model and controller components of each selected application(s).

The host device may utilize the current operating characteristics to determine and select which components are to be executed by the head unit. Continuing the previous example, assume application_2 is very computationally intensive and application 4 is data intensive. In this situation, the view and controller components of application_4 and the view components of application 2 may be selected in the first set to be executed by the head unit, while the model components of application_4 and the controller and model components of application_2 are not selected. In this way, more of the heavy computation components are executed on the host device, rather than on the head unit.

The components selected for execution may be dependent on a plurality of different parameters of the current operating characteristics. For example, a plurality of different thresholds may be utilized to determine which components are selected based on the networking bandwidth between the host device and the head unit. For example, the lower the bandwidth, the higher the number of components selected to be executed by the head unit, which can reduce the amount of data transferred between the host device and the head unit during the dual head unit and host device execution of the selected application. These examples are not to be limiting, and other metrics and parameters may be utilized to select the first set of components.

Process 400 proceeds to block 408, where a second set of components of the selected application(s) are selected to be executed by the host device. Similar to what is described above in block 406, the host device may utilize the current operating characteristics to determine and select which components are to be executed by the host device. In various embodiments, the second set of components includes all components of the selected application(s) that are not selected in block 406. So in the example above, the model components of application_4 and the controller and model components of application_2 are selected in the second set to be executed by the host device.

In some embodiments, an application may include components that must be executed on the head unit or must be executed on the host device. For example, some view components may be required to execute on the head unit itself due to the interaction with the actual hardware that is rendering images on the head unit, and cannot be selected for execution on the host device. In at least one embodiment, all of the components of a selected application are in the first set of components to be executed by the head unit, while the second set of components includes a null set in which none of the components of the selected application are to be executed by the host device.

In some other embodiments, the host device may select a third set of components to be executed by another computing device, such as mobile device 26 or another computing device 28, as described herein. Similar to what is described above in block 406, the host device may utilize the current operating characteristics to determine and select which components are to be executed by this other computing device.

Process 400 continues next at block 410, where the first set of components is provided to the head unit for execution by the head unit. In various embodiments, the host device pushes, downloads, or otherwise interacts with the head unit to provide these components to the head unit. In various embodiments, an operating system of the head unit coordinates the interaction of components that are executing on the head unit with components that are executing on the host device so that the user experience is the same as if the entire application was executing on the head unit. In some embodiments, the head unit may store all components of each of the plurality of applications that the host device can select at block 404. In at least one such embodiment, the host device notifies the head unit of which components the head unit is to execute and which components the host device is to execute.

In some other embodiments, if a third set of components is selected to be executed by another computing device, the host device provides those components to that other computing device for execution by that computing device. In some embodiments, the first set of components executing on the head unit may interact with the third set of components executing on other computing device to facilitate the combined coordinated running of the application.

Process 400 proceeds next to block 412, where the host device executes the second set of components in conjunction with the first set of components executing on the head unit. As described herein, the application is designed such that at least some of the application components can execute autonomously from each other and on different devices. In this way, the application is unaware and indifferent of what components are executing on which device, whether they are executing on the head unit, the host device, or some other device.

In various embodiments, the second set of components executing on the host device interact with the first set of components executing on the head unit to enable the selected application(s) to properly function as the application is designed. In some embodiments, if a third set of components is selected and executing on another computing device, the second set of components executing on the host device may interact with the third set of components executing on the other computing device to enable the selected application(s) to properly function as the application is designed.

Process 400 continues at block 414, which is described in more detail below in conjunction with FIG. 5. Briefly, however, the host device monitors the current operating characteristics associated with the running of the selected application(s) and the head unit, the host device, or any other device executing at least a part of the application. The host device can continually monitor the operating characteristics while also executing the second set of components in conjunction with the execution of the first set of component on the head unit. In various embodiments, the head unit may provide information and status updates to the host device at predetermined times or when the information or status changes. For example, the head unit may provide its physical location to the host device once every minute, but the head unit may provide a change in the current user of the host device when a new user is selected or identified by the head unit. The information provided to the host device is monitored for changes that could be used to dynamically change which components are selected for execution by the head unit.

Process 400 proceeds to decision block 416 to determine whether a change has occurred in the current operating characteristics. In various embodiments, the change may occur if a value of the operating characteristics changes beyond a predetermined threshold. For example, if the location of the automobile moves by more than one kilometer or the load on the head unit increases 30%, then a change has occurred that may impact the shared execution of the application. These examples are not to be limiting and other parameters may be used to determine that there is a change in the current operating characteristics that could be used to modify the selection of applications or the selection of components that are provided to the head unit for execution by the head unit. If a change in the current operating characteristics is identified, then process 400 loops to block 404 to select other application(s) or to select a new set of components to be executed by the head unit or the host device at blocks 406 and 408; otherwise, process 400 loops to block 414 to continue to monitor the current operating characteristics for changes in the current operating characteristics. In various embodiments, the selected application can continue to be executed while the host device is monitoring the operating characteristics.

Figure 5:
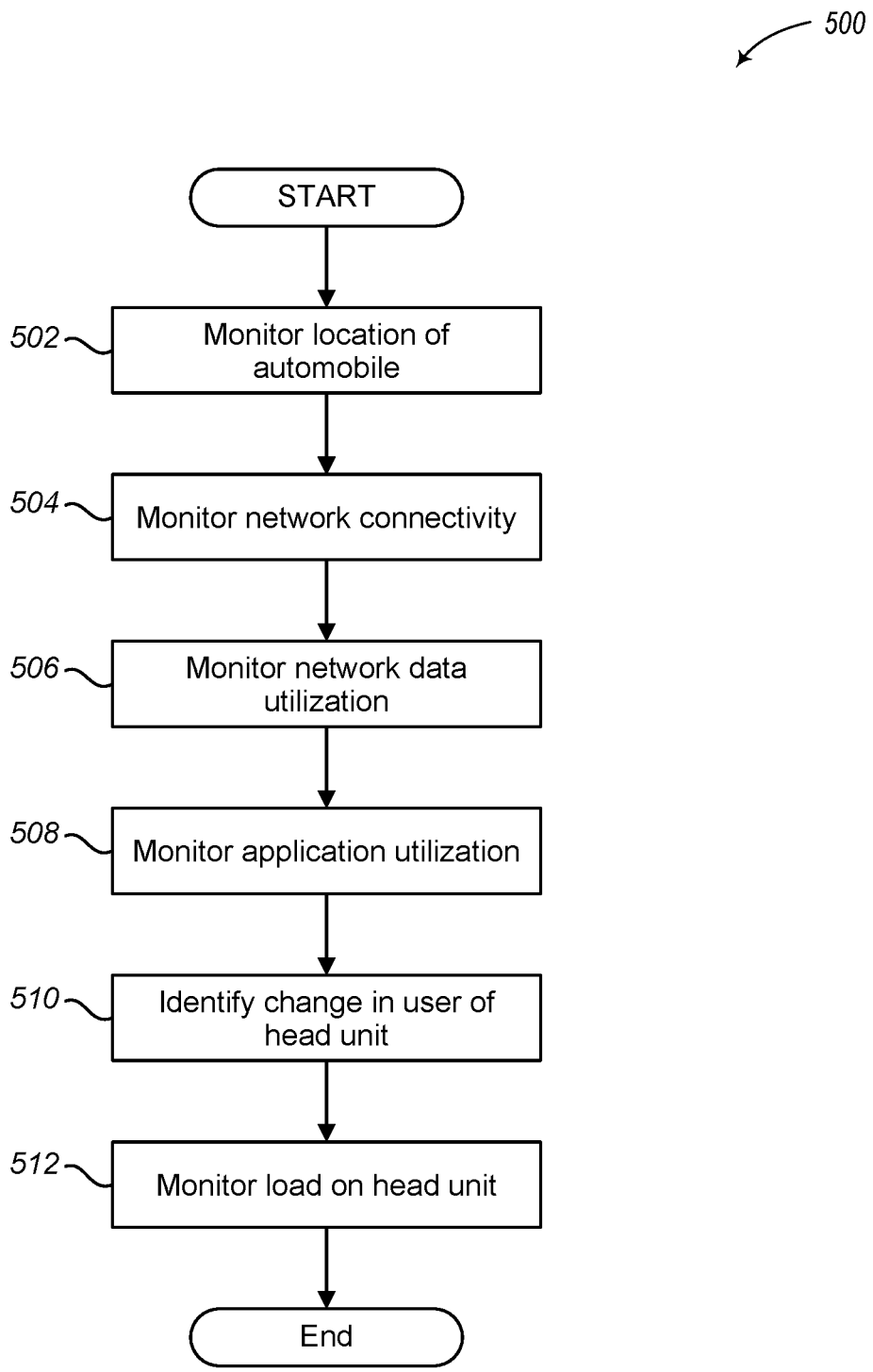
FIG. 5 illustrates a logical flow diagram generally showing one embodiment of a process for monitoring the operating characteristics of the head unit environment to identify changes that effect whether to modify which applications or components are executing on the head unit in accordance with embodiments described herein.

FIG. 5 illustrates a logical flow diagram generally showing one embodiment of a process for monitoring the operating characteristics of the head unit environment to identify changes that effect whether to modify which applications or components are executing on the head unit in accordance with embodiments described herein.

Process 500 begins, after a start block, at block 502, where the location of the automobile is monitored. In various embodiments, a change in the automobile's location may indicate a change in the current operating characteristics that prompts a change in the components executing on the head unit. For example, if the automobile is moving in a direction that will take the automobile into an area of limited or no cellular network coverage, then the host device may want to provide additional components of the applications to the head unit before the network connection is lost. Since components executing on the head unit coordinate with components executing on the host device, if the head unit loses cellular network access, then that coordination may be suspended, which could reduce or halt the functionality of the application. But, by providing additional components from the host device to the head unit, the head unit can execute the application without having to rely on the cellular network connectivity to coordinate with components executing on the host device. Other types of changes in the automobile's location may also be monitored.

Process 500 proceeds to block 504, where the network connectivity between the host device and the head unit is monitored. In various embodiments, the head unit may periodically send heartbeat messages to the host device indicating that there is still a network connection. In other embodiments, receiving information or status updates of other operating characteristics may also indicate the network connectivity. In some other embodiments, the host device may test the network connectivity by sending messages to the head unit and calculate how long they take to return. Embodiments are not so limited and other types of network connectivity measures or monitoring techniques may be employed. If the network connectivity is continually getting worse, then the host device may push more components to the head unit, but if the network connectivity improves, then the host device may take back execution of some of the components from the head unit.

Process 500 continues at block 506, where network data utilization is monitored. In various embodiments, the host device calculates the amount of data transmitted in both directions between the host device and the head unit. In some embodiments, the head unit may track an amount of data transmitted in both directions between the head unit and one or more data servers, such as remote data server(s) 126 in FIG. 1. The head unit may provide this tracked data to the host device so that the host device can determine a total amount of network bandwidth being used by the head unit. In some embodiments, as the amount of network data utilized increases, additional components may be provided to the head unit for execution by the head unit in an attempt to reduce the amount of network data utilized in the coordination of components executing on the host device with components executing on the head unit.

Process 500 proceeds next to block 508 to monitor application utilization on a per application basis. The head unit may provide various metrics about application utilization to the host device. Such metrics may include an amount of time a user uses an application, an amount of computing resources used by the applications, a frequency of use, a correlation of use and location of the automobile, a time of day of use, or other measurable aspects of how a user uses an application.

This monitored utilization can be used to predict when and how much a user will use an application and change which applications are selected and provided to a user at any given time. For example, assume a user only uses a specific music application when driving on the freeway. If the host device initially identifies at block 402 in FIG. 4 that the automobile is driving on city streets, the application may not be selected at block 404. As a result, the music application is not currently available for use by the user. When the host device identifies the automobile as being on the freeway, it can select the music application and provide the music application to the head unit, such as by selecting which components of the music application are to be executed by the head unit and which component of the music application are to be executed by the host device, as described herein.

Process 500 continues next at block 510, where a change in the user of the head unit is identified. In some embodiments, an occupant in the automobile may utilize a user interface on the head unit to select a different user of the head unit. In other embodiments, a mobile device that begins accessing an accessory in the automobile may be an indication of a different user. The head unit can provide an identifier of the new user to the host device, such can be used to select a profile of the new user and select other applications to provide to the head unit.

Process 500 proceeds to block 512, where a load on the head unit is monitored. This monitored load may include a percentage of processor utilization, an amount of used or available memory, or other computing resource capacity utilization. If the current load on the head unit increases beyond a predefined threshold, then a change in the current load on the head unit may indicate that some components, especially computationally heavy components, should be executed by the host device rather than the head unit. As a result, the host device can modify the selection of which components are executing on the head unit, as described herein.

After block 512, process 500 terminates or returns to a calling process to perform other actions.

In various embodiments, one or more current operating characteristics may be monitored and utilized, singularly or in combination, to determine if there is a change in the current operating characteristics that prompts a change in the applications provided to the head unit or a change in the selection of which components are executed by the head unit and which components are executed by the host device. These changes can occur in real time or near real time as the head unit is being utilized. As such, the host device dynamically monitors and adjusts where the components of the applications are executing based on the current operating characteristics associated with the head unit. Additionally, the above described operating characteristics are not limiting and other operating characteristics that impact the user experience or the operating environment of the head unit may be monitored.

Although process 400 in FIG. 4 and process 500 in FIG. 5 are described with reference to an application running on a head unit for a user of the head unit, embodiments are not so limited. In other embodiments, process 400 and process 500 may be performed to dynamically modify which application components are executing on some other computing device, such as computing device 28 or mobile device 26 described in conjunction with FIG. 2A, which is being used by a user to run applications in accordance with embodiments described herein.

In some other embodiments, process 400 and process 500 may be performed by a head unit, or other computing device 28, rather than the host device. In at least one such embodiment, it is the head unit that selects one or more applications to provide to the user on the head unit; selects which components are to execute on the head unit; selects which other components are to execute on the host device or any other device; provide the other components to those other devices, and monitors its own current operating characteristics to determine if there is a change in the operating characteristics; and dynamically modify which components are executing on each device based on those changed operating characteristics.

It should be understood that the embodiments described in the various flowcharts may be executed in parallel, in series, or in a combination thereof, unless the context clearly dictates otherwise. Accordingly, one or more blocks or combinations of blocks in the various flowcharts may be performed concurrently with other blocks or combinations of blocks. Additionally, one or more blocks or combinations of blocks may be performed in a sequence that varies from the sequence illustrated in the flowcharts.

Figure 6:
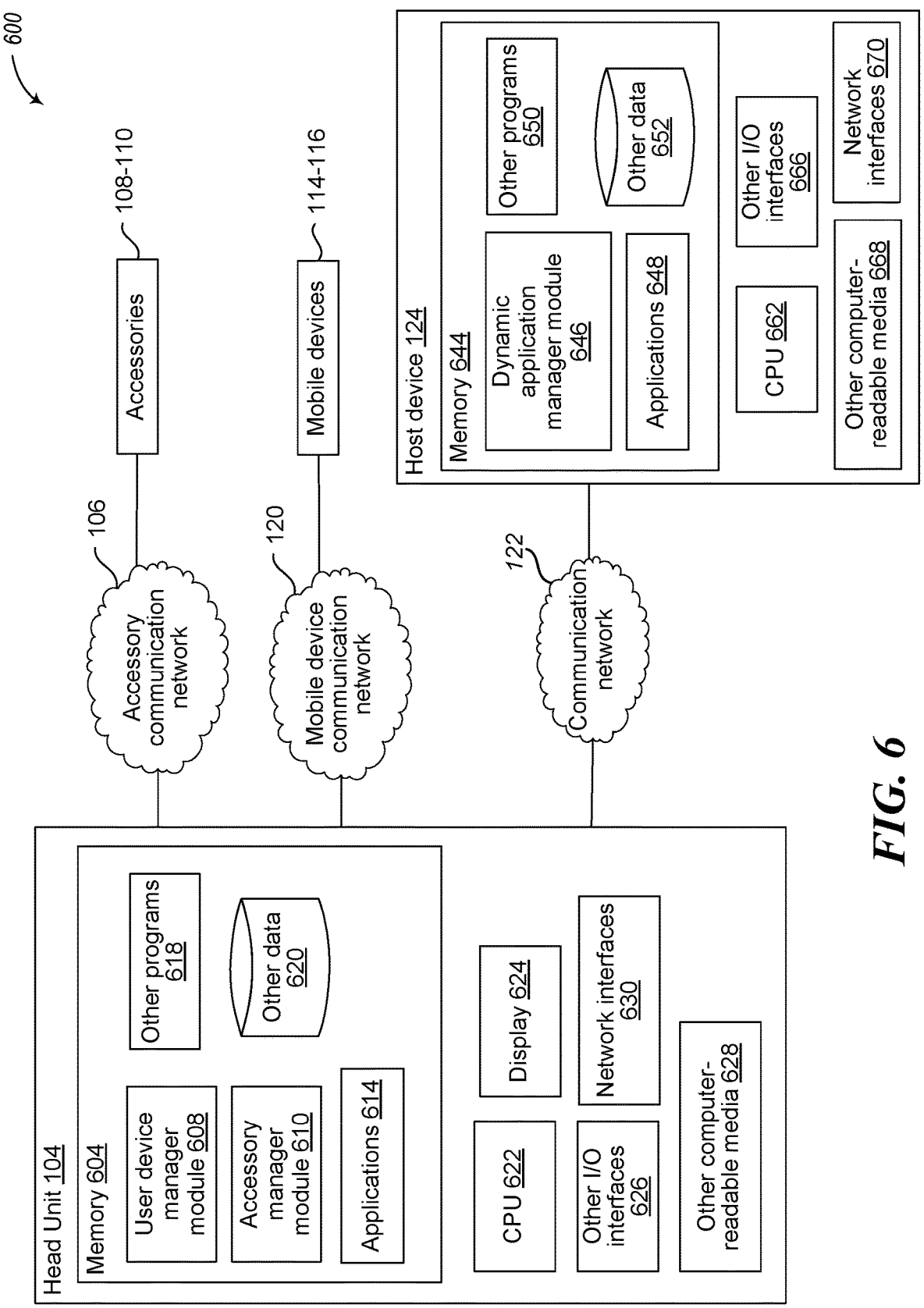
FIG. 6 shows a system diagram that describes one implementation of computing systems for implementing embodiments described herein.

FIG. 6 shows a system diagram that describes one implementation of computing systems for implementing embodiments described herein. System 600 includes head unit 104, host device 124, accessories 108-110, and mobile devices 114-116.

One or more special-purpose computing systems are used to implement host device 124 to dynamically select which application(s) components are executed by the head unit 104, and which components are executed by the host device 124, as described herein. Accordingly, various embodiments described herein may be implemented in software, hardware, firmware, or in some combination thereof. Host device 124 includes memory 644, one or more central processing units (CPUs) 662, I/O interfaces 666, other computer-readable media 668, and network interfaces 670.

Memory 644 may include one or more various types of non-volatile and/or volatile storage technologies. Examples of memory 644 include, but are not limited to, flash memory, hard disk drives, optical drives, solid-state drives, various types of random access memory (RAM), various types of read-only memory (ROM), other computer-readable storage media (also referred to as processor-readable storage media), or other memory technologies, or any combination thereof. Memory 644 may be utilized to store information, including computer-readable instructions that are utilized by CPU 662 to perform actions, including at least some embodiments described herein.

Memory 644 may have stored thereon various modules, which include dynamic application manager module 646. The dynamic application manager module 646 monitors operating characteristics associated with the head unit 104 and determines which components are executed by the head unit 104 and which components are executed by the host device 124. The dynamic application manager module 646 provides the selected components to the head unit 104 via communication network 122. The dynamic application manager module 646 can receive, via communication network 122, a variety of data and information from the head unit 104 to identify the operating characteristics associated with the head unit 104 or changes in the operating characteristics, which are used to dynamically modify the selection of components executing on the head unit 104.

Memory 644 also has stored hereon applications 648. Applications 648 include a plurality of components of one or more applications. As described herein, the host device 124 determines which components are executed by the head unit 104 and which components are executed by the host device 124. So, some components of applications 648 may be executed by CPU 662 on host device 124, and some may be provided to head unit 104 as applications 614 and executed by CPU 622 on head unit 104.

Memory 644 may also store other programs 650 and other data 652. The other data 652 may include one or more user profiles of users that use the head unit 104. For example, if multiple people drive the automobile that includes the head unit 104, a profile may be stored for each different driver. Profiles may also be stored for one or more passengers of the automobile. Each profile may include a list of applications that the user uses most often, an identity of a most recently used application, user preferences, and other information. These profiles may be utilized by the host device 124 to determine the current operating characteristics of the head unit 104. For example, in some embodiments, a user can select or enter a user identifier into the head unit 104, or the head unit may determine the user identifier based on a key or key fob used to start the automobile. The head unit 104 provides this user identifier to the host device 124. The host device 124 uses the user identifier to lookup the corresponding user profile in the other data 652. The information in the user profile can be used as at least an initial set of current operating characteristics associated with the head unit 104.

I/O interfaces 666 may include interfaces for various other input or output devices, such as audio interfaces, display interfaces, other video interfaces, USB interfaces, or the like. Other computer-readable media 668 may include other types of stationary or removable computer-readable media, such as removable flash drives, external hard drives, or the like. Network interfaces 670 are configured to communicate with other computing devices, such as head unit 104 via communication network 122.

One or more special-purpose computing systems are used to implement head unit 104 to execute application components and communicate with the host device 124, as described herein. Accordingly, various embodiments described herein may be implemented in software, hardware, firmware, or in some combination thereof. Head unit 104 includes memory 604, one or more central processing units (CPUs) 622, display 624, I/O interfaces 626, other computer-readable media 628, and network interface 630.

Memory 604 may include one or more various types of non-volatile and/or volatile storage technologies. Examples of memory 604 include, but are not limited to, flash memory, hard disk drives, optical drives, solid-state drives, various types of random access memory (RAM), various types of read-only memory (ROM), other computer-readable storage media (also referred to as processor-readable storage media), or other memory technologies, or any combination thereof. Memory 604 may be utilized to store information, including computer-readable instructions that are utilized by CPU 622 to perform actions, including at least some embodiments described herein.

Memory 604 may have stored thereon various modules, which include user device manager module 608 and accessory manager module 610. User device manager module 608 may communicate with one or more of mobile devices 114-116 via mobile device communication network 120. User device manager module 608 can receive command requests from the mobile devices 114-116 to control accessories 108-110 and can send accessory data and information to the mobile devices 114-116. Accessory manager module 610 can interacts with one or more of accessories 108-110 via accessory communication network 106. The accessory manager module 610 can receive accessory data and information from accessories 108-110 and send command requests to control accessories 108-110.

Memory 604 also has stored hereon applications 614. Applications 614 include one or more components of one or more applications, which are provided to the head unit 104 by the host device 124 and executed by the head unit 104, as described herein. Applications 614 may include one or more accessories. These accessories may include, for example, navigation applications, radio and audio applications, automobile environmental controls applications, automobile performance or maintenance applications, or other automobile related applications.

Memory 604 may also store other programs 618 and other data 620. The other data 620 may store accessory data or other data associated with the various accessories 108-110. For example, the other data 620 may store music playlists or radio station favorites, map waypoints, user contact information, user preferences for heads-up-display information and layout, etc.

Display 624 is a display device capable of rendering content or information to a user. For example, display 624 may display maps, radio station information, applications, environmental controls for the automobile, other user interfaces, etc. The display 624 may be a liquid crystal display, light emitting diode, or other type of display device, and include a touch sensitive screen capable of receiving inputs from a user's hand, stylus, or other object.

I/O interfaces 626 may include interfaces for various other input or output devices, such as audio interfaces, other video interfaces, USB interfaces, or the like.

Other computer-readable media 628 may include other types of stationary or removable computer-readable media, such as removable flash drives, external hard drives, or the like.

Network interfaces 630 are configured to communicate with other computing devices, such as host device 124 via communication network 122, mobile devices 114-116 via mobile communication network 120, and accessories 108-110 via accessory communication network 106.

For ease of illustration, system 600 is described with reference to head unit 104. But as described above, other computing devices 28 or mobile devices 26 may also be used in the implementation of dynamically allocating application components to be executed on separate processing devices, as described herein. And those systems may include similar computing resources as illustrated with respect to head unit 104, such as a processor, display, network interface, memory, other interfaces, etc.

The various embodiments described above can be combined to provide further embodiments. These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. A method of dynamically allocating components of an application for execution on separate devices, wherein the application includes a plurality of components, the method comprising:
   identifying current operating characteristics associated with a head unit, wherein one of the current operating characteristics is network availability associated with the head unit;
   allocating a view component of the application to the head unit for execution by the head unit, wherein the view component is for providing a visual representation of the operation of the application to a user of the head unit;
   allocating one or more remaining components of the application to a cloud resource for execution by the cloud resource in coordination with the execution of the view component by the head unit, wherein the remaining components of the application are for providing operational aspects of the application;
   identifying a degradation of the network availability associated with the head unit; and
   based on identifying the degradation of the network availability associated with the head unit, dynamically allocating the components for providing operational aspects of the application from the cloud resource to the head unit for execution by the head unit in coordination with the execution of the view component by the head unit.

2. The method of claim 1, wherein the network availability associated with the head unit is network coverage available to the head unit, network connectivity available to the head unit, or network bandwidth available to the head unit.

3. The method of claim 1, wherein the components for providing operational aspects of the application include a model component, a controller component, or an operations component.

4. The method of claim 1, further comprising:
   identifying a reversal in the degradation of the network availability associated with the head unit; and
   based on identifying the reversal in the degradation of the network availability associated with the head unit, dynamically allocating the components for providing operational aspects of the application from the head unit back to the cloud resource for execution by the cloud resource in coordination with the execution of the view component by the head unit.

5. The method of claim 4, further comprising, based on identifying the reversal in the degradation of the network availability associated with the head unit, notifying the head unit to stop executing the components for providing operational aspects of the application.

6. The method of claim 1, further comprising emitting events to and listening for events from the head unit when the cloud resource is executing the components for providing operational aspects of the application and the head unit is executing the view component of the application.

7. The method of claim 1, further comprising:
   allocating one or more of the components for providing operational aspects of the application to a mobile device in communication with the head unit for execution by the mobile device in coordination with the execution of the view component by the head unit and the execution of the components for providing operational aspects of the application by the cloud resource; and
   based on identifying the degradation of the network availability associated with the head unit, dynamically allocating the components for providing operational aspects of the application from the cloud resource to the head unit for execution by the head unit in coordination with the execution of the view component by the head unit or to the mobile device for execution by the mobile device in coordination with the execution of the view component by the head unit.

8. The method of claim 1, wherein the cloud resource is a host device responsible for the allocation of the components of the application.

9. A system, comprising:
a host device, including:
   a memory configured to store instructions; and
   a processor configured to execute the instructions to:
      detect a state of network availability associated with a head unit of an automobile;

allocate a view component of an application to the head unit for execution by the head unit, wherein the view component is for providing a visual representation of the operation of the application to a user of the head unit;

allocate one or more other components of the application to the host device for execution by the host device in coordination with the execution of the view component by the head unit, wherein the other components of the application are for providing operational aspects of the application;

detect a change in the state of network availability associated with the head unit; and based on the detection of the change in the state of network availability associated with the head unit, allocate the components for providing operational aspects of the application from the host device to the head unit for execution by the head unit.

10. The system of claim 9, wherein the change in the state of network availability associated with the head unit is an impending loss of network coverage for the head unit or an impending limit on an amount of data that can be transmitted to or received from the head unit.

11. The system of claim 9, wherein the processor is further configured to execute the instructions to:

detect a second change in the state of network availability associated with the head unit; and based on the detection of the second change in the state of network availability associated with the head unit, allocate the components for providing operational aspects of the application from the head unit back to the host device for execution by the host device.

12. The system of claim 11, wherein the second change in the state of network availability associated with the head unit is an impending reestablishment of network coverage for the head unit or an impending removal or resetting of the limit on the amount of data that can be transmitted to or received from the head unit.

13. The system of claim 9, wherein the processor is further configured to execute the instructions to:

detect a new user of the head unit;

allocate a view component of a second application to the head unit for execution by the head unit, wherein the view component of the second application is for providing a visual representation of the operation of the second application to the new user of the head unit; and allocate one or more other components of the second application to the host device for execution by the host device in coordination with the execution of the view component of the second application by the head unit, wherein the other components of the second application are for providing operational aspects of the second application.

* * * * *